United States Patent
Moynihan et al.

(10) Patent No.: US 10,044,457 B2
(45) Date of Patent: Aug. 7, 2018

(54) PREVENTING INVALID DEFECT DETECTION DURING OTN OUT-OF-FRAME STATES

(71) Applicant: Ciena Corporation, Hanover, MD (US)

(72) Inventors: Jeffrey Scott Moynihan, Cumming, GA (US); Matthew W. Connolly, Canton, GA (US)

(73) Assignee: Ciena Corporation, Hanover, MD (US)

(*) Notice: Subject to any disclaimer, the term of this patent is extended or adjusted under 35 U.S.C. 154(b) by 515 days.

(21) Appl. No.: 13/868,343

(22) Filed: Apr. 23, 2013

(65) Prior Publication Data
US 2014/0314402 A1    Oct. 23, 2014

(51) Int. Cl.
| H04L 12/26 | (2006.01) |
| H04L 1/00  | (2006.01) |
| H04J 1/16  | (2006.01) |
| H04J 3/14  | (2006.01) |
| H04J 3/16  | (2006.01) |
| H04J 3/06  | (2006.01) |
| H04L 12/24 | (2006.01) |

(52) U.S. Cl.
CPC .......... H04J 3/1652 (2013.01); H04J 3/0608 (2013.01); H04J 3/14 (2013.01); H04L 41/0618 (2013.01); H04L 43/0847 (2013.01); H04L 43/062 (2013.01)

(58) Field of Classification Search
CPC ....................................................... H04B 10/08
USPC ................................................... 398/17–20
See application file for complete search history.

(56) References Cited

U.S. PATENT DOCUMENTS

| 6,795,451 B1* | 9/2004 | Giorgetta ............ H04J 3/14 370/428 |
| 7,035,292 B1* | 4/2006 | Giorgetta ............ H04J 3/1611 370/509 |
| 7,602,814 B2 | 10/2009 | Meagher et al. |
| 8,059,685 B2 | 11/2011 | Ghodrat et al. |
| 8,204,382 B2 | 6/2012 | Gazier et al. |

(Continued)

OTHER PUBLICATIONS

G709 OTN "Optical Transport Network Tutorial", Guylain Barlow, 2009 (JDSU white paper).*

(Continued)

*Primary Examiner* — Yemane Mesfin
*Assistant Examiner* — Abdelillah Elmejjarmi
(74) *Attorney, Agent, or Firm* — Clements Bernard Walker PLLC; Christopher L. Bernard; Lawrence A. Baratta, Jr.

(57) ABSTRACT

Methods and systems can suppress invalid defect detection when Out-Of-Frame (OOF) conditions occur within an Optical Transport Network. One method for processing a report of a defect during an OOF condition may include detecting the OOF condition at a downstream node, detecting an indication of the defect caused by the OOF condition, suppressing a report associated with the indication of the defect, determining whether the OOF condition is clear, determining whether the indication of the defect is still present if the OOF condition is clear; and cancelling the report if the indication of the defect is not present. A network node which processes a report of a defect during an OOF condition may include a network interface, and a processor which is coupled to the network interface. The processor may be configured to perform a method for suppressing invalid defect detection during OOF conditions.

19 Claims, 5 Drawing Sheets

(56) References Cited

U.S. PATENT DOCUMENTS

| | | |
|---|---|---|
| 8,259,733 B2 | 9/2012 | Conklin et al. |
| 8,356,233 B2 | 1/2013 | Nichols et al. |
| 2010/0054731 A1 | 3/2010 | Oltman et al. |
| 2012/0106948 A1 | 5/2012 | Moynihan et al. |
| 2012/0106950 A1 | 5/2012 | Madrahalli et al. |
| 2012/0213508 A1 | 8/2012 | Moynihan |
| 2013/0051792 A1* | 2/2013 | Smith .................. H04J 3/14 398/20 |

OTHER PUBLICATIONS

Gendron, R. and Gidaro, A., "The G.709 Optical Transport Network—An Overview. Application Note 153." EXFO Expertise Reaching Out. Telecom Test and Measurement. 2006 EXFO Electro-Optical Engineering Inc. Jun. 2009.

Agilent Technologies, "An Overview of ITU-T G.709. Application Note: 1379." pp. 1-12.

Fujitsu Network Communications Inc., "The Key Benefits of OTN Networks." Richardson, Texas. us.fujitsu.com/telecom. pp. 1-8.

Ciena, "OTN Outperforms SONET/SDH." White Paper. Linthicum, MD. www.ciena.com. pp. 1-7.

ITU, "Optical Transport Network (OTN) Tutorial." Contact: Timothy P. Walker, twalker@amcc.com. AMCC, USA. pp. 1-62.

Ciena, "The Value of OTN for Network Convergence and IP/Ethernet Migration" White Paper. Linthicum, MD. www.ciena.com, pp. 1-3.

* cited by examiner

PREVENTING INVALID DEFECT DETECTION DURING OTN OUT-OF-FRAME STATES

FIELD OF DISCLOSURE

Aspects of this disclosure generally relate to optical networking systems. Specifically, the disclosure presents approaches for suppressing invalid defect detection when Out-Of-Frame (OOF) conditions occur within Optical Transport Network (OTN) systems.

BACKGROUND

OTN (Optical Transport Network) is a standard which defines an encapsulation protocol permitting the optical transmission of a wide variety of different signals over a common optical medium. OTN provides the flexibility for transparently multiplexing and mapping synchronous and/or asynchronous client signals (each of which may be represented in their own standard protocols) over fiber-optic networks, including optical networks employing Wavelength Division Multiplexing (WDM). The OTN standard was developed by the ITU-T, which defines OTN as a set of Optical Network Elements (hereinafter referred to as "nodes") connected by optical fiber links, able to provide the functionality of transport, multiplexing, switching, management, supervision, and survivability of optical channels carrying client signals. ITU Standard G.709 defines various aspects of OTN, and may be referred to as a "digital wrapper" technology which defines a layer hierarchy for payload encapsulation, Operations, Administration, Maintenance (OAM) overhead, forward error correction (FEC), and multiplexing. The result is a transport standard that includes the benefits of Sonet/SDH (such as resiliency and manageability) but with improvements for transporting asynchronous data payloads such as Gigabit Ethernet. Accordingly, OTN was specifically designed to be a multiservice transport container for essentially any type of data service, from TDM to packet, and this flexibility is one of OTN's advantages. OTN has been widely deployed for transport within long-haul networks, particularly because the inherent FEC features enable optical transmission over longer distances.

FIG. 1 shows a simplified diagram of an exemplary OTN layer hierarchy 100 and its associated frame structures 150 defined in ITU G.709. The OTN layer hierarchy 100 may be broadly divided into four layers, Optical Payload Unit (OPUk) 104, Optical Data Unit (ODUk) 106, Optical Transport Unit (OTUk) 108, and Optical Channel (OCh) 109. Because various OTN layers may exchange data using a variety of different rates, e.g., OTU1, OTU2, and OTU3, and ODU0, these rates may be collectively referred to as having a "k" appended to the appropriate layer's acronym, such as "ODUk" and "OTUk." The OPUk layer 104, ODUk layer 106, and the OTUk layer 108 operate in the electrical domain. The OCh layer 109 operates in the optical domain.

End user services, which are referred to herein as "Clients" 102, may provide Client signal frame 152 in a variety of different protocols to the OPUk layer 104. The Client signal frame 152 may include signals using synchronous networking protocols, such as SONET and SDH, and/or asynchronous protocols, such as ATM, Ethernet, and/or Fibre Channel. The OPUk layer 104, which contains all the timeslots in the OTN frame, may encapsulate the Client signal frame 152, and add OPUk overhead, to produce an OPUk frame 154. The Client signal frame 152 is essentially unmodified by the network, aside from being mapped at the source node and demapped at the sink node. The ODUk layer 106, which provides path level transport functions, receives the OPUk frame 154, appends its own ODUk overhead, and encapsulates the OPUk frame 154 to produce an ODUk frame 156. The OTUk layer 108, which provides section-level overhead, receives the ODUk frame 156, appends its own OTUk overhead and Forward Error Correction (FEC) information, and encapsulates the ODUk frame 156 to produce an OTUk frame 158. The OCh layer 109 serializes a plurality of OTUk frames 158, and appends its own overhead to produce the OCh frame 159.

Because OTN serves as a "digital wrapper" for a variety of synchronous and asynchronous signals using different protocols as noted above, the OTUk frame timing may be based on the ODUk layer frame timing. An OTN node performing connections at the ODUk layer, moves ODUk connections (in or out) from one OTUk to another. When the ODUk frame mapped into an OTUk frame changes, the OTUk frame timing will typically change. This change in timing can cause an Out-Of-Frame (OOF) condition at one or more downstream nodes. The downstream nodes should adjust to the change in OTUk frame timing and transition back to an in-frame (IF) state within a period of time defined as the OOF interval.

During this OOF interval, the shift of the OTUk frame may cause the downstream nodes to look in the wrong locations for various status bits, and subsequently detect invalid defects which should not be reported and acted upon by the network. However, conventional control elements within the network may not be able to ascertain that the reported defects are invalid, and thus may unnecessarily consume resources attempting to address these "defects" which otherwise could be safely ignored.

SUMMARY

Aspects of the invention are directed to apparatuses and method for suppressing invalid defect detection when Out-Of-Frame (OOF) conditions occur within Optical Transport Network (OTN) systems.

One embodiment may include method for processing a report of a defect during an Out-Of-Frame (OOF) condition. The method may include detecting the OOF condition at a downstream node, and detecting an indication of the defect caused by the OOF condition. The method may further include suppressing a report associated with the indication of the defect, and determining whether the OOF condition is clear. The method may further include determining whether the indication of the defect is still present if the OOF condition is clear, and cancelling the report if the indication of the defect is not present.

Another embodiment may include a network node which processes a report of a defect during an Out-Of-Frame (OOF) condition. The network node may include a network interface, and a processor coupled to the network interface. The processor may be configured to detect the OOF condition at a downstream node, and detect an indication of the defect caused by the OOF condition. The processor may be further configured to suppress a report associated with the indication of the defect, and determine whether the OOF condition is clear. The processor may be further configured to determine whether the indication of the defect is still present if the OOF condition is clear, and cancel the report if the indication of the defect is not present.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Figure 1:
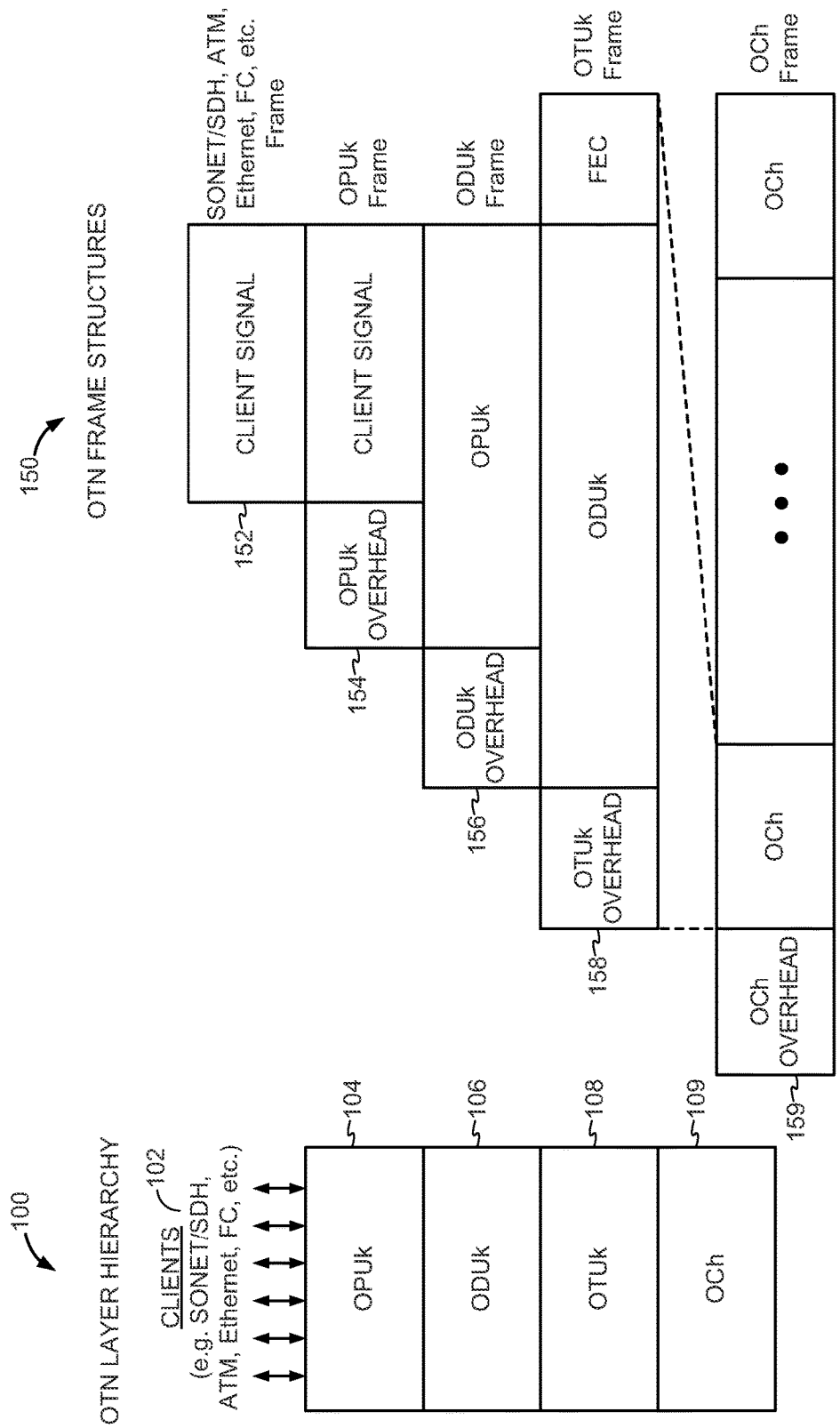
FIG. 1 shows a simplified diagram of an exemplary OTN layer hierarchy and its associated frame structures defined in ITU G.709.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage, or mode of operation.

The terminology used herein is for the purpose of describing particular embodiments only and is not intended to be limiting of embodiments of the invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

In OTN networks, the OTUk frame timing may be based on the ODUk layer frame timing. A node (e.g., an OTN switch) performing connections at the ODUk layer, can move ODUk connections from one OTUk to another. When an ODUk frame mapped into an OTUk frame changes, the OTUk frame timing will typically change (e.g., shift). The ODUk frame can change when there is a change in the ODUk client, or from an ODU-AIS (Alarm Indication Signal) or an ODU-OCI (Open Connection Indication) to an ODU client. One or more of these conditions can cause an Out-Of-Frame (OOF) OTUk condition at one or more a downstream nodes. As used herein, a "downstream" node may be a node which subsequently receives an OTUk frame from another node after an ODUk frame change occurs. The downstream node's interfaces typically will adjust to the change in OTUk timing and transition back to an In-Frame (IF) state. When caused by a new ODUk connection, the period of time for which the OOF condition lasts is generally, for example, between 5 and 10 OTUk frames. During this period of time, which is called an OOF interval, the downstream interface can detect defects which should not be reported and should not cause the network node to take an action.

The shift of the OTUk frame frequently causes downstream Status Byte defects, for example, such Status Byte defects may include an Alarm Indication Signal (AIS), an Open Connection Indication (OCI), a Locked condition (LCK), and a Backwards Defect Indication (BDI). This occurs because the downstream node may be looking at the wrong bits due to the timing change. Less frequently, a Trail Trace Identifier (TTI) Mismatch defect could be raised, although the OOF condition would need to last for longer than a multi-frame which is generally not the case. When the OOF condition clears, the upstream interface sends an Incoming Alignment Error (IAE) signal to clear any performance monitoring counts detected during the OOF state. However, the IAE signal does not clear any defect detected during the OOF state. Because the defects are detected as a result of the OOF condition, these defects are referred to herein as "invalid" defects. Network problems can be magnified when a Control Plane sets up multiple connections along a path at slightly different times. The setup of a mid-path connection can cause downstream invalid defects in the OTUk and ODUk overheads. In a Control Plane enabled network, these invalid defects can cause one or more Sub-Network Connections (SNCs) to be released, including the SNC being setup, thus potentially wasting network resources. For example, properly detecting the invalid defects may permit the cancelling of the error reports, and thus prevent the control plane from unnecessarily rerouting an ODUk frame.

Embodiments of the invention may utilize the OOF OTUk condition to prevent invalid defects from being raised on the OTN interface. One or more downstream nodes can detect the OOF condition and monitor any defects on the interface, but not report the defects until the OOF has cleared. An OOF that persists for a predetermined period of time (e.g., three milliseconds) should result in a Loss of Frame (LOF) condition being declared on the OTUk interface. As noted above, most OOF conditions due to ODUk connection setup occur for less than 10 OTUk frames (approximately 25 microseconds at the OTU3 rate). This time period may not be long enough to cause an OTUk LOF (e.g., three milliseconds), however it is more than enough time to cause an OTUk and/or ODUk Status Byte defect (e.g., five frames). The suppression of invalid Status Byte defects during an OOF condition prevents unnecessary traffic affecting protection switches or control plane mesh restorations. Moreover, suppressing invalid defects helps maintain the stability of the control plane by not responding to defects it should ignore.

Figure 2:
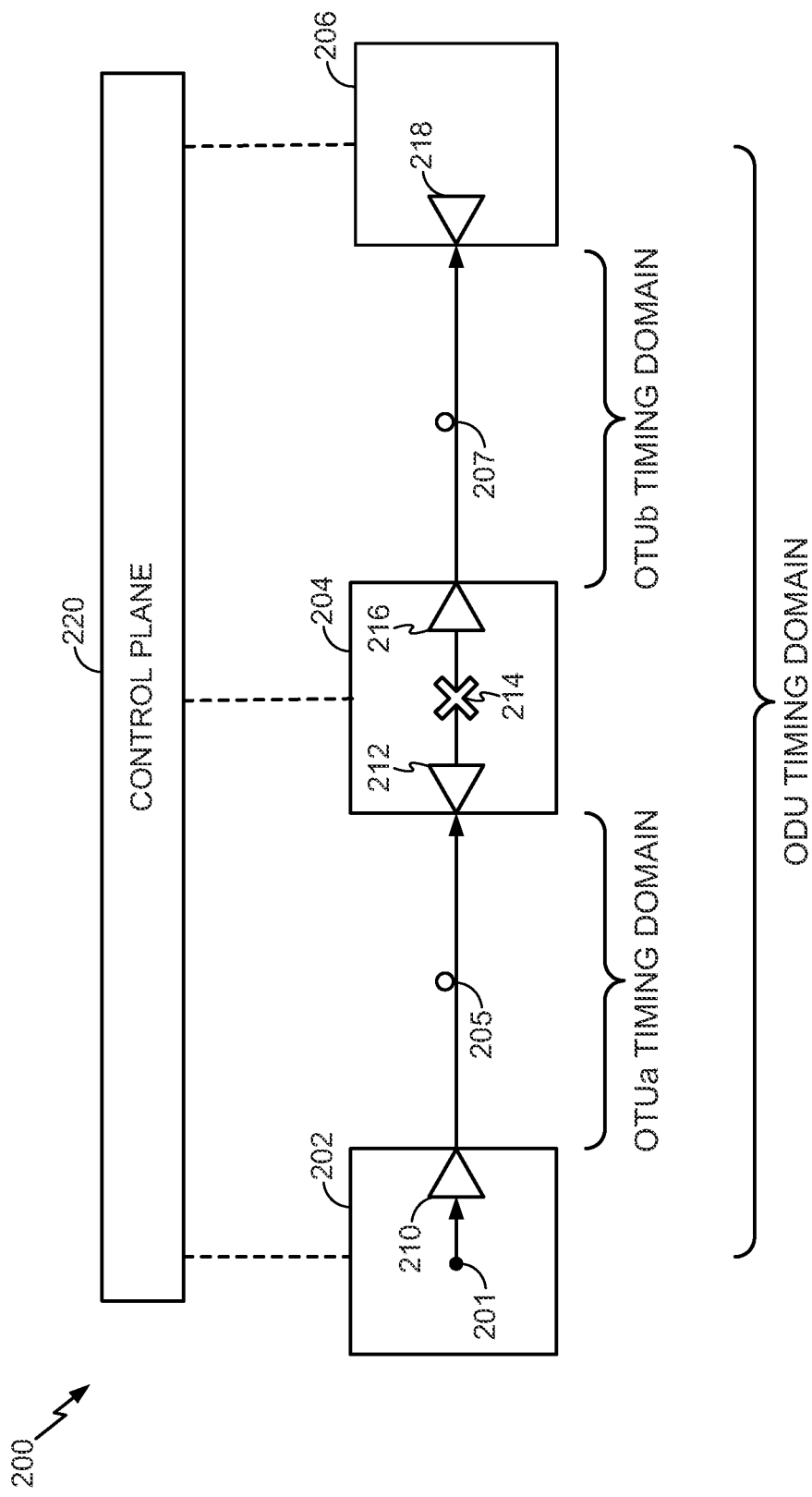
FIG. 2 shows a block diagram of a simplified network illustrating how invalid defects may arise from Out-Of-Frame conditions and how they may be addressed.

FIG. 2 shows a block diagram of a simplified network 200 illustrating how invalid defects may arise from Out-Of-Frame conditions and how they may be addressed. Network 200 may include Optical Network Elements (hereinafter referred to as "nodes") 202, 204, and 206 which may switch within a network. Each node 202, 204, and 206 may be interconnected by one or more optical links. For example, node 202 and node 204 may be interconnected by optical link 205; and node 204 and 206 may be interconnected by optical link 207. Additionally, each node 202, 204, and 206 may be connected to a control plane 220, which functions facilitates network routing, as will be discussed in more detail below in the explanation of FIG. 3. The timing between individual nodes across optical links may be controlled at the OTUk layer, and timing across multiple nodes may be controlled at the ODUk layer. Accordingly, OTUk frames sent from node 202 to node 204 originate from transmitter 210, traverse across optical link 205, and are received at node 204 by receiver 212. OTUk frames sent from node 204 to node 206 originate from transmitter 216, traverse across optical link 207, and are received at node 206 by receiver 218.

In the example shown in FIG. 2, OTUa and OTUb timing may be based on an incoming ODU frame at point 201 in node 202. As used in the following explanation, "OTUa" and "OTUb" indicate different OTU timing domains. A change in the timing reference can cause an Out Of Frame (OOF) condition at both the OTUa and OTUb frames. A timing reference change in an OTUk frame can be caused by the change in the cross connection 214 of the ODU from one ODU client to another (which may be driven by the change in the timing requirements the client signal frame 102), or from an ODU-Alarm Indication Signal (AIS) or an ODU-Open Connection Indication (OCI) condition to an ODU client. The ODUk timing change may cause a downstream OTUk out-of-frame (OOF) condition.

In order to compensate for the OTUk OOF condition, embodiments of the invention may suppress or "mask" defects which arise during this OOF condition by assuming these defects are invalid because their cause is merely the result of the timing shift of the OTUk frame. Accordingly, during the OTUk OOF interval, one or more downstream nodes can detect the defects and suppress them by taking no action to address the "defects." Thus, the invalid defects are effectively suppressed because they are not reported to the control plane 220.

Figure 3:
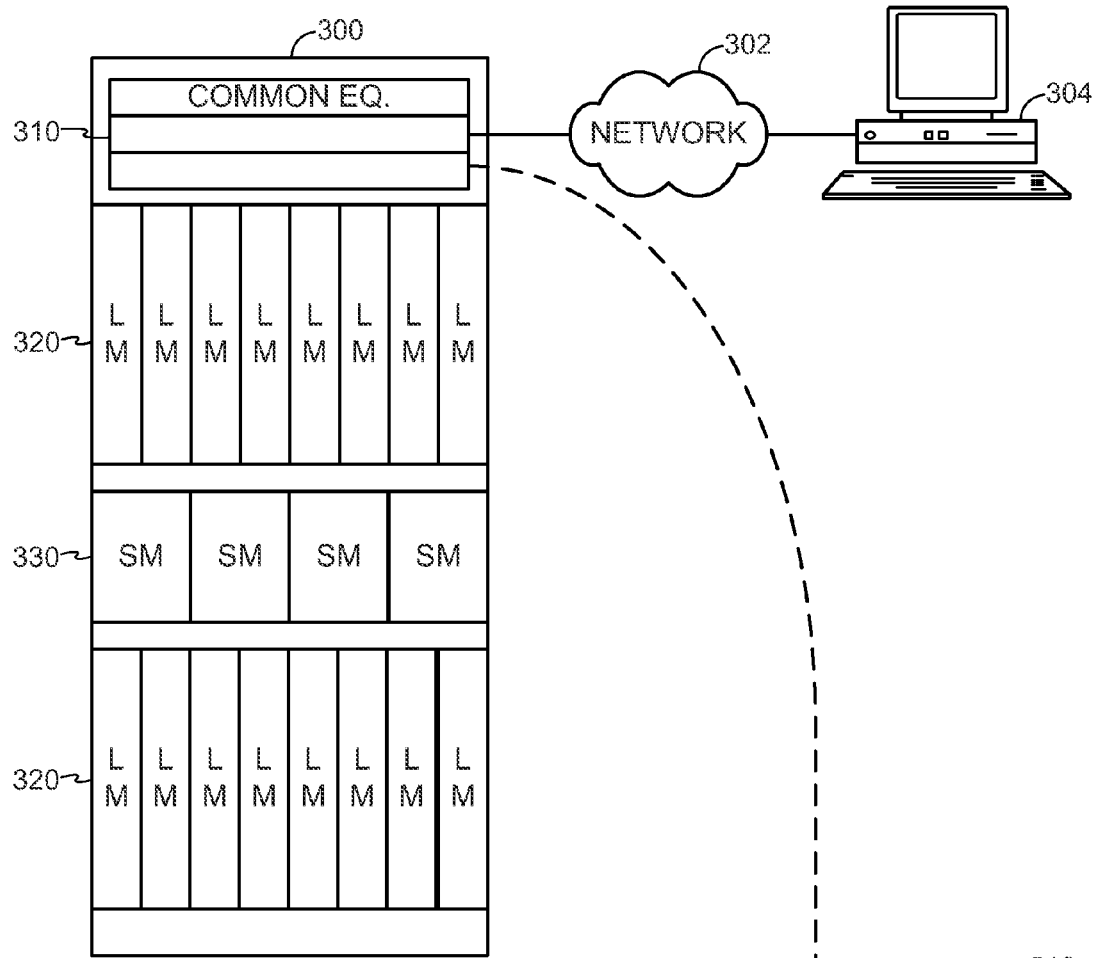
FIG. 3 is a block diagram of a node for suppressing invalid defect detection when Out-Of-Frame conditions occur within the network.

FIG. 3 is a block diagram of a node 300 for suppressing invalid defect detection when Out-Of-Frame (OOF) conditions occur within the network. The node 300 may be embodied by an optical switch utilizing SONET, SDH, OTN, and the like. The node 300 may consolidate the functionality of a multi-service provisioning platform (MSPP), SONET/SDH digital cross connect (DCS), Ethernet and Optical Transport Network (OTN) switch, dense wave division multiplexed (DWDM) platform, etc. into a single, high-capacity intelligent switching system providing layer 0, 1, and 2 consolidation. Generally, the node 300 may include common equipment 310, line modules (LM) 320, and switch modules (SM) 330.

The common equipment 310 may include power, a control module (CM) 512 (shown in detail in FIG. 5), operations, administration, maintenance, and provisioning (OAM&P) access, and the like. For example, the common equipment 310 may connect to a management system 304 through a data communication network 302. The management system 304 may include a network management system (NMS), element management system (EMS), or the like. Additionally, the common equipment 310 may include a control plane processor configured to operate the control plane and the systems and methods described herein with regard to invalid defect suppression. The line modules (LM) 320 may be communicatively coupled to the switch modules (SM) 330, such as through a backplane, mid-plane, or the like. The line modules (LM) 320 may be configured to provide ingress and egress to the switch modules (SM) 330, and are configured to provide interfaces for the OTN services described herein. In an exemplary embodiment, the line modules (LM) 320 may form ingress and egress switches with the switch modules (SM) 330 as center stage switches for a three-stage switch, e.g. three stage Clos switch. The line modules (LM) 320 may include optical transceivers, such as, for example, 2.5 Gb/s (OC-48/STM-1, OTU1, ODU1), 10 Gb/s (OC-192/STM-64, OTU2, ODU2), 40 Gb/s (OC-768/STM-256, OTTO, ODU4), etc. Further, the line modules (LM) 320 may include a plurality of optical connections per module and each module may include a flexible rate support for any type of connection, such as, for example, 155 Mb/s, 622 Mb/s, 1 Gb/s, 2.5 Gb/s, 10 Gb/s, 40 Gb/s, and 100 Gb/s. The line modules (LM) 320 may include DWDM interfaces, short reach interfaces, and the like, and may connect to other line modules (LM) 320 on remote switch, nodes, end clients, and the like. From a logical perspective, the line modules (LM) 320 provide ingress and egress ports to the node 300, and each line module (LM) 320 may include one or more physical ports. Further, the node 300 may include software and the like to track logical objects such as connection termination points, trail termination points, etc. associated with the line modules (LM) 320.

The switch modules (SM) 330 are configured to switch services between the line modules (LM) 320. For example, the switch modules (SM) 330 may provide wavelength granularity, SONET/SDH granularity such as Synchronous Transport Signal-1 (STS-1), Synchronous Transport Module level 1 (STM-1), Virtual Container 3 (VC3), etc.; OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical channel Pay load Virtual Containers (OPVCs), etc.; Ethernet granularity; and the like. Specifically, the switch modules (SM) 330 may include both Time Division Multiplexed (TDM) and packet switching engines. The switch modules (SM) 330 may include redundancy as well, such as 1:1, 1:N, etc. In an exemplary embodiment, the line modules (LM) 320 and the switch modules (SM) 330 are configured to manage and provide SONET, SDH, and OTN line signals. That is, the line modules (LM) 320 and the switch modules (SM) 330 may be line terminating in terms of SONET, SDH, and OTN overhead.

Figure 4:
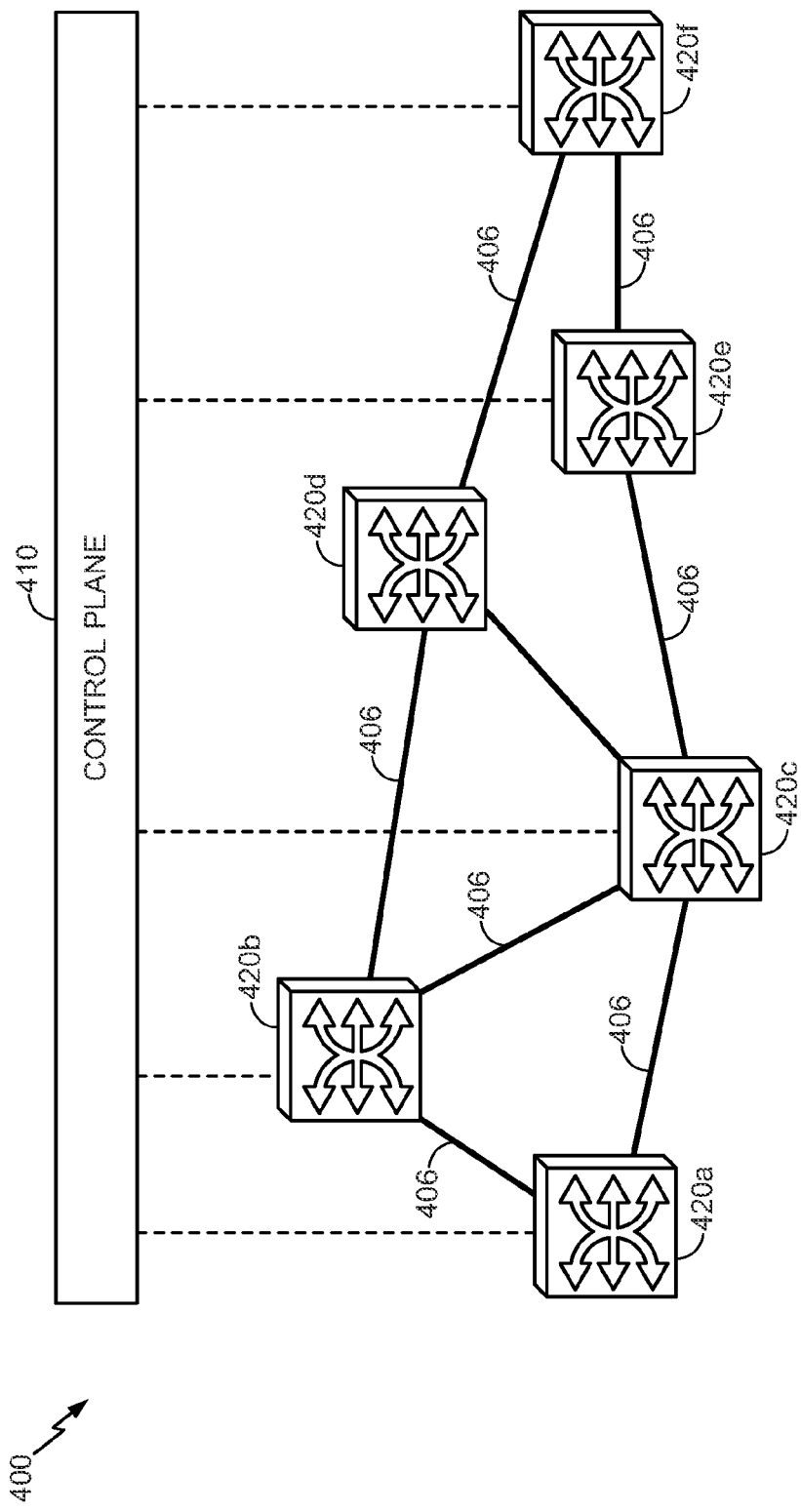
FIG. 4 is a block diagram illustrating an exemplary network consistent with embodiments of the invention.

FIG. 4 is a block diagram illustrating an exemplary network 400 consistent with embodiments of the invention. The network 400 may include a plurality of nodes 420a-420f interconnected with optical links 406. For brevity, when disclosing common aspects pertaining to all of the nodes 420a-420f, the reference number 420 will be used without any letter designation. The network 400 is illustrated with the nodes 420 forming mesh architecture; however the systems and methods described herein are equally applicable to other architectures, such as rings, linear, and the like. The optical links 406 may include optical fiber carrying one or more wavelengths between adjacent nodes 420. The network 400 may also include a control plane 410 which may operate a signaling and routing protocol. For example, the control plane 410 may include Optical Signaling and Routing Protocol (OSRP), Automatically Switched Optical Networks ITU-T Recommendation G.8080: Architecture for the Automatically Switched Optical Network (ASON) 2001, Generalized Multi-Protocol Label Switching Architecture (G-MPLS) IETF RFC 3945, 2004, and the like. The control plane 410 may perform functions such as automatic resource discovery, distributing network resource information, establishing and restoring connections dynamically across the network, and the like.

One or more nodes, e.g., optical switch 420d, may be a line terminating equipment (LTE) network element and typically will not participate in the control plane 410. For example, the optical switch 420d may be a legacy network element, may be a submarine LTE network element, may be from a different equipment vendor, may belong to another operator, or the like. For embodiments described herein, nodes which perform suppression of invalid defects during OOF conditions will typically be functionally coupled to the control plane, and thus serve as control plane link termination points (e.g., nodes 420a, 420b, 420c, 420e, and 420f are the control plane link termination points shown in FIG. 4).

Figure 5:
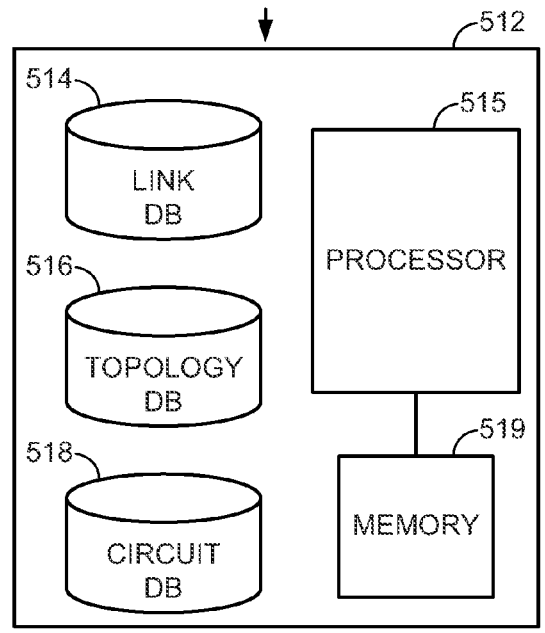
FIG. 5 shows an exemplary embodiment of a control module (CM) associated with a node which may perform invalid defect suppression.

FIG. 5 shows an exemplary embodiment of a control module (CM) 512 associated with the node 300 which may perform invalid defect suppression when OOF conditions occur within the network. The CM 512 may be part of the common equipment 310 in the node 300 as shown in FIG. 3. The CM 512 may include a processor 515 which may be a hardware device for executing software instructions stored in an associated memory 519. The processor 515 may be any custom made or commercially available processor, a central processing unit (CPU), an auxiliary processor among several processors associated with the CM 512, a semiconductor-based microprocessor (in the form of a microchip or chip set), or generally any device for executing software instructions. Alternatively, processor 515 may be a custom designed ASIC. When the CM 512 is in operation, the processor 515 can be configured to execute software stored within memory 519, to communicate data to and from the memory 519, and/or to generally control operations of the CM 512 pursuant to the software instructions.

The CM 512 may also include network interfaces, a data store, and the like. The network interfaces may be used to enable the CM 512 to communicate on a network, such as to communicate control plane information to other CMs. The network interfaces may include, for example, an Ethernet card (e.g., 10BaseT, Fast Ethernet, Gigabit Ethernet) or a wireless local area network (WLAN) card (e.g., 802.11a/b/g). The network interfaces may include address, control, and/or data connections to enable appropriate communications on the network. The data store may be used to store data, such as control plane information received from other nodes, and/or their CMs, etc. The data store may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store may incorporate electronic, magnetic, optical, and/or other types of storage media. The memory may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory may incorporate electronic, magnetic, optical, and/or other types of storage media. Note that the memory may have a distributed architecture, where various components are situated remotely from one another, but may be accessed by the processor.

The CM 512 may further include a link database (DB) 514, a topology DB 516, and/or a circuit DB 518 functionally coupled to processor 515. The CM 512 may be responsible for all control plane processing associated with the node 300, and further perform invalid defect suppression when OOF conditions occur within the network. For example, the control plane may include OSRP, ASON, G-MPLS, or the like. It may perform many functions such as automatic resource discovery, distributing network resource information, establishing and restoring connections dynamically across the network, and the like. However, the present invention is not limited to OSRP, as other intelligent signaling and routing protocols that can (or can be modified to) provide similar functionality as OSRP (e.g., automatically establishing and restoring connections across the network, and the like) may be used.

The DBs 514, 516, 518 may be stored in the memory and/or some other data store. The link DB 514 includes updated information related to each link in a network. The topology DB 516 includes updated information related to the network topology, and the circuit DB 518 includes a listing of terminating circuits and transiting circuits at a node where the CM 512 is located. The CM 512 may utilize control plane mechanisms to maintain the DBs 514, 516, 518. For example, a HELLO protocol can be used to discover and verify neighboring ports, nodes, protection bundles, and the like. Also, the DBs 514, 516, 518 may share topology state messages to exchange information to maintain identical data. Collectively, the processor 515 and the DBs 514, 516, 518 may be utilized to advertise topology information, capacity availability, create and manage trail termination points, and provide connection management (provisioning and restoration). For example, each link in a network may have various attributes associated with it, such as, for example, line protection, available capacity, total capacity, administrative weight, protection bundle identification, delay, and the like. The processor 515 and the DBs 514, 516, 518 may be configured to provide automated end-to-end provisioning.

Further, the CM 512 is configured to communicate to other CMs 512 in other nodes on the network. This communication may be either in-band or out-of-band. In an exemplary embodiment, the present invention includes an in-band signaling mechanism utilizing SONET, SDH, or OTN overhead. The General Communication Channels (GCC) defined by ITU-T Recommendation G.709 "Interfaces for the optical transport network (OTN)" G.709 are in-band side channel used to carry transmission management and signaling information within Optical Transport Network elements. The GCC channels include GCC0 and GCC 1/2. GCC0 are two bytes within Optical Channel Transport Unit-k (OTUk) overhead that are terminated at every 3 R (Re-shaping, Re-timing, Re-amplification) point. GCC1/2 are four bytes (i.e. each of GCC1 and GCC2 include two bytes) within Optical Channel Data Unit-k (ODUk) overhead. In various embodiments, GCC0, GCC1, GCC2 or GCC 1+2 may be used for in-band signaling or routing to carry control plane traffic. Based on the intermediate equipment's termination layer, different bytes may be used to carry control plane traffic. If the ODU layer has faults, it has been ensured not to disrupt the GCC1 and GCC2 overhead bytes and thus achieving the proper delivery control plane packets.

Figure 6:
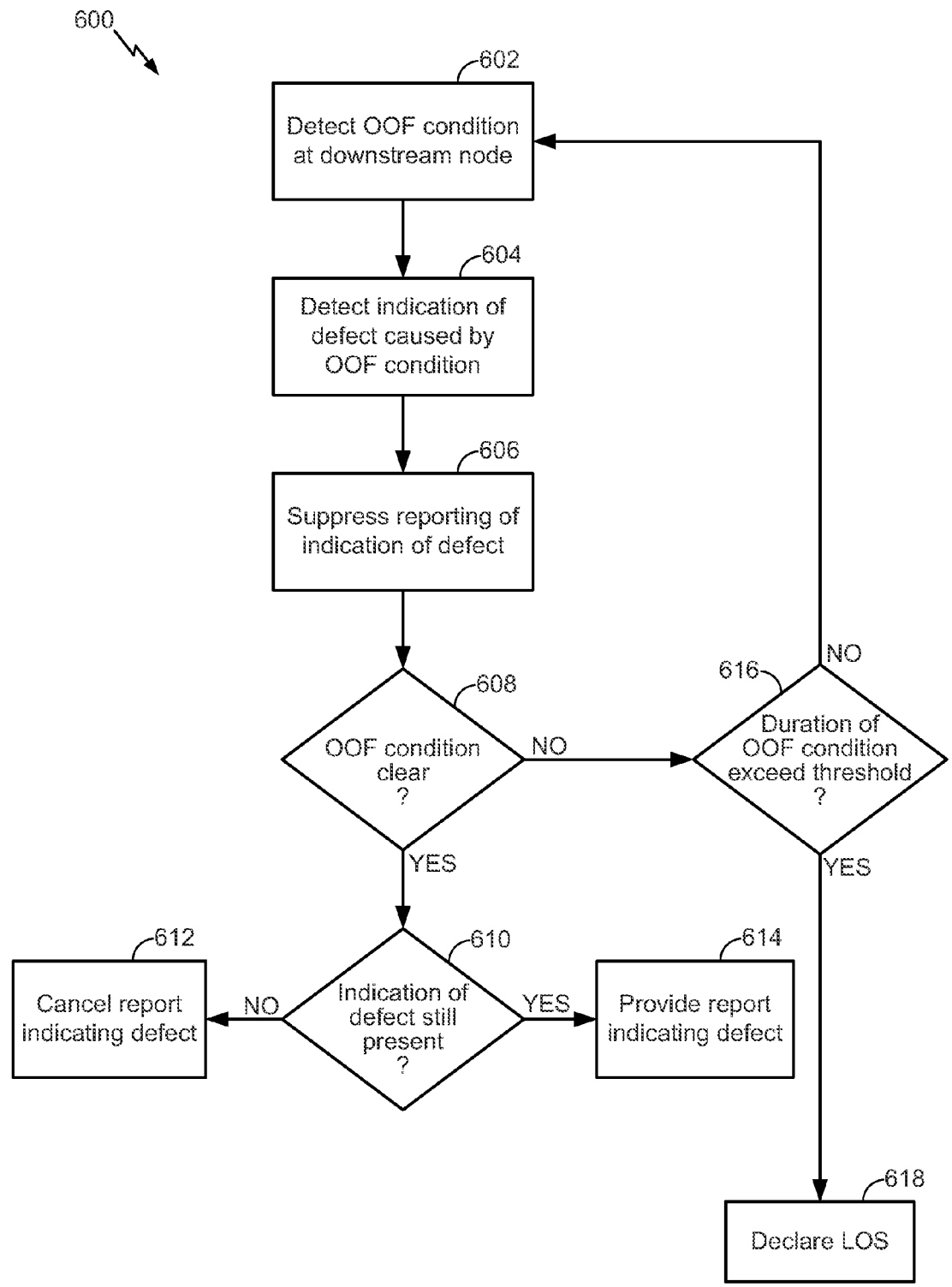
FIG. 6 is a flowchart showing an exemplary process for suppressing invalid defects during OOF conditions.

FIG. 6 is a flowchart showing an exemplary process 600 for suppressing invalid defects during OOF conditions. The process 600 may be performed at one or more downstream nodes serving as control plane link termination points. Initially, process 600 may detect an OOF condition (602). The OOF condition may be caused by the change in timing of the OTUk frame due to ODUk timing changes. Once the OOF condition is detected, the process may detect an indication of a defect caused by the OOF condition (604). Such defects are invalid defects as they are caused by, for example, the shift in the OTUk frame. Accordingly, the process may suppress the reporting of the detected defect for the time being (606). The process may then determine whether the OOF condition is clear (608). If the OOF condition is not clear, a check is made to determine if the duration of time for the OOF interval has exceeded a threshold (e.g., a threshold may be 3 milliseconds) (616). If the threshold is exceeded, the node may declare a Loss Of Frame (LOS) condition on the OTUk interface (618). Most OOF conditions due to ODUk connection setup occur for less than 10 OTUk frames, which is about 25 microseconds at the OTU3 rate. While this time period is not long enough to cause an OTUk LOF (e.g., 3 milliseconds); however, it may be more than enough time to cause a OTUk and/or ODUk Status Byte defect (5 frames). Accordingly, if the threshold in Block 616 has not been exceeded, the process may loop back to Block 602.

If it is determined that the OOF condition is clear in Block 608 (implying the shift in the OTUk frame has be corrected), the process 600 may then check whether the indication of the defect is still present (610). If so, the node may provide a report to the control plane that an actual defect exists (614). If the indication of the defect is no longer present, then the process will cancel (e.g., not provide) any report indicating a status byte defect (612).

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences, and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method for processing a report of a defect during an Out-Of-Frame (OOF) condition, comprising: detecting the OOF condition at a downstream node; detecting an indication of the defect caused by the OOF condition that causes creation of a report: suppressing the report associated with the indication of the defect; determining whether the OOF condition is clear; if the OOF condition is clear, determining whether the indication of the defect is still present such that the defect is a valid defect; and if the indication of the defect is not present, cancelling the report after the OOF condition is clear and before the OOF condition becomes a Loss Of Frame (LOF) condition or a Loss of Signal (LOS) condition since the defect is an invalid defect caused by the OOF condition which is now cleared, wherein the cancelling of the report prevents a control plane from rerouting a connection associated with the ODUk frame.

2. The method of claim 1, further comprising: providing the report if the indication of the defect is present.

3. The method of claim 1, further comprising: determining whether the OOF condition persists for more than a predetermined period of time when it is determined that the OOF condition is not clear.

4. The method of claim 3, wherein it is determined that the OOF condition does not persist for more than the predetermined period of time, further comprises: repeating the detecting the OOF condition, the detecting the indication of the defect caused by the OOF condition, the suppressing the report associated with the indication of the defect, and the determining whether the OOF condition is clear.

5. The method of claim 3, wherein it is determined that the OOF condition exceeds the predetermined period of time, further comprises: declaring the Loss Of Frame (LOF) condition.

6. The method of claim 3, wherein predetermined period of time is three milliseconds.

7. The method of claim 1, wherein the OOF condition is caused by a change in timing of an OTUk (Optical Transport Unit) frame due to a timing reference change of an ODUk (Optical channel Data Unit) frame.

8. The method of claim 7, wherein timing reference change of the ODUk frame is caused by a change in a cross connection of the ODUk frame from one ODUk client to another ODUk client, from an ODU-AIS (Alarm Indication Signal), an ODU-OCI (Open Connection Indication) condition to an ODUk client, or any combination thereof.

9. The method of claim 1, wherein the detecting the defect caused by an OOF condition occurs within five frames.

10. The method of claim 2, wherein the report is provided to a control plane.

11. A network node which processes a report of a defect during an Out-Of-Frame (OOF) condition, comprising: a network interface; and a processor, coupled to the network interface, configured to (i) detect the OOF condition at a downstream node, (ii) detect an indication of the defect caused by the OOF condition that causes creation of a report, (iii) suppress the report associated with the indication of the defect, (iv) determine whether the OOF condition is clear, (v) if the OOF condition is clear, determine whether the indication of the defect is still present such that the defect is a valid defect, and (vi) if the indication of the defect is not present, cancel the report after the OOF condition is clear and before the OOF condition becomes a Loss Of Frame (LOF) condition or a Loss of Signal (LOS) condition since the defect is an invalid defect caused by the OOF condition which is now cleared, wherein the canceled report prevents a control plane from rerouting a connection associated with the ODUk frame.

12. The network node of claim 11, wherein the processor is further configured to: provide the report if the indication of the defect is present.

13. The network node of claim 11, wherein the processor is further configured to: determine whether the OOF condition persists for more than a predetermined period of time when it is determined that the OOF condition is not clear.

14. The network node of claim 13, wherein it is determined that the OOF condition does not persist for more than the predetermined period of time, the processor is further configured to: repeat the detecting the OOF condition, the detecting the indication of the defect caused by the OOF condition, the suppressing the report associated with the indication of the defect, and the determining whether the OOF condition is clear.

15. The network node of claim 13, wherein it is determined that the OOF condition exceeds the predetermined period of time, wherein the processor is further configured to: declare the Loss Of Frame (LOF) condition.

16. The network node of claim 13, wherein predetermined period of time is three milliseconds.

17. The network node of claim 11, wherein the OOF condition is caused by a change in timing of an OTUk (Optical Transport Unit) frame due to a timing reference change of an ODUk (Optical channel Data Unit) frame.

18. The network node of claim 17, wherein timing reference change of the ODUk frame is caused by a change in a cross connection of the ODUk frame from one ODUk client to another ODUk client, from an ODU-AIS (Alarm Indication Signal), an ODU-OCI (Open Connection Indication) condition to an ODUk client, or any combination thereof.

19. The network node of claim 11, wherein the detecting the defect caused by an OOF condition occurs within five frames.

* * * * *